W. B. CONNELL.
TIRE.
APPLICATION FILED MAR. 29, 1909.
958,693.
Patented May 17, 1910.
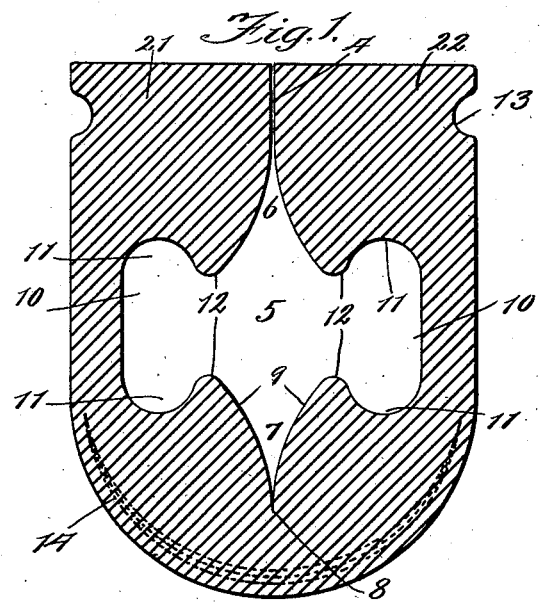
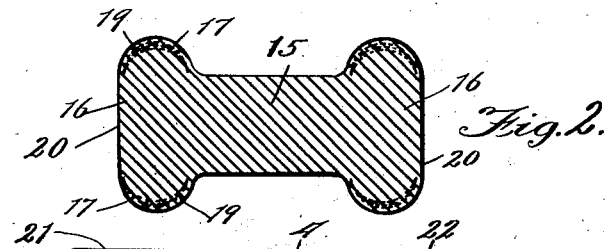
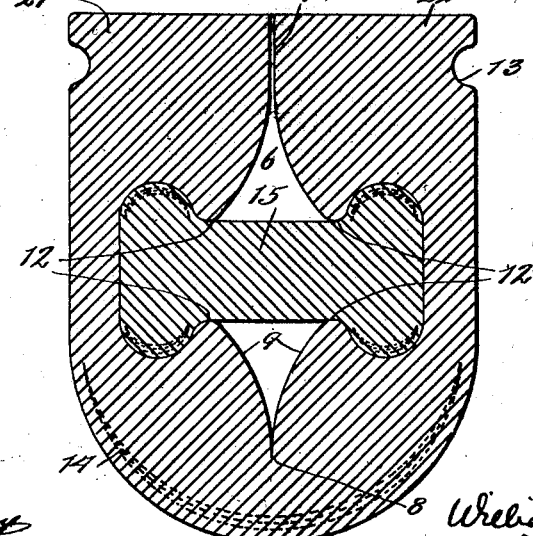
Witnesses:
Inventor:
William B. Connell
By Buckley Durand & Drury
Attys.

UNITED STATES PATENT OFFICE.

WILLIAM B. CONNELL, OF CHICAGO, ILLINOIS.

TIRE.

958,693.

Specification of Letters Patent.  Patented May 17, 1910.

Application filed March 29, 1909. Serial No. 486,336.

*To all whom it may concern:*

Be it known that I, WILLIAM B. CONNELL, a citizen of the United States of America, and resident of Chicago, Cook county, Illinois, have invented a certain new and useful Improvement in Tires, of which the following is a specification.

My invention relates to improvements in rubber tires, having more especial reference to those used for automobiles and has for its object the production of a tire that will possess the greatest amount of resiliency and yet one that is not completely compressible.

A further object is the production of a tire in which a new and improved form of tension member is used, thereby greatly increasing the efficiency and life of the tire.

A further object is the production of a composite tire, the parts of which can be quickly assembled and one in which the parts thereof cannot become disarranged.

A further object is the production of a tire than can be cheaply constructed and one using a minimum of material with a maximum of efficiency.

These and such other objects as may hereinafter appear, are attained by my device, an embodiment of which is illustrated in the accompanying drawings in which—

Figure 1 represents a sectional view of my tire with the tension member removed. Fig. 2 represents a sectional view of the tension member. Fig. 3 represents a sectional view of the tire ready for use.

Like numerals of reference indicate like parts in the several figures of the drawing.

Referring now to the drawings—The main body of the tire is formed integrally as shown in Fig. 1, having a slit 4 in its upper face communicating with the interior channel 5. The upper and lower portions of the channel 5 terminate in V-shaped portions 6, 7, the point of the lower V being shown at 8. The walls of the V-shaped portion are preferably curved as shown at 9, forming a pair of vertical arches. The opposite sides of the channel 5 terminate in flaring pockets or supplemental channels 10, having upper and lower curved surfaces as shown at Fig. 1, and upwardly and downwardly projecting shoulders 12. The upper portion of the tire is cut away or shaped, as shown at 13, to fit the form of the wheel, and the lower portion or tread is preferably provided with a fabric filling 14 preferably located some little distance inside the outer face of the tread. This gives increased strength to the tire, and also permits the resurfacing of the tire when the rubber is worn down so as to expose the fabric.

The tension member shown in Fig. 2 is shown of substantially the same cross-section as an I-beam, with substantially rounded ends; the tension member proper comprising the web 15 and the enlarged ends 16, these ends terminating above and below in curved shoulders 17, conforming to the interior face of the pockets 10. I may, if I desire, insert fabric 19 within these shoulders near the outer surface thereof in order to give greater strength to the structure. I have shown the end faces 20 of the I-beams as straight. It is evident that these may be made curved if desired, or of such configuration as to fit any desired form of pocket within the main body of the tire, the idea being that the tension member itself shall be provided with enlarged ends.

In the assembling of my tire, the two ends 21, 22, are pulled apart and the tension member inserted therein, the ends 16 fitting within the pockets 10 therein. The outer portion of the tire is formed preferably circular, the same as in the ordinary casing, while the tension member is preferably formed in a straight piece and of such a length as to exactly fit within the channel 5. The two sides 21, 22, of the compression member are allowed to come together, as the tension member is placed within the supplemental channel and when the member is put in place the tire is in condition to be placed in position on the wheel.

By the use of this improved device, the direct strain on the upper and lower surfaces of the tire is transmitted directly to the ends of the tension member, the tendency being at all times to preserve an arch on every side of the tension member. The strain through the shoulders 12 against the inner surfaces of the ends 16 tends to lock the tension members in place and prevent displacement, and the direct strain is transmitted onto the upper portion of the curved ends and simply tends to compress these ends and at the same time assists in holding them while in place. The strain through the shoulders against the inner surfaces of the ends tends immediately to stretch the web 15 of the tension member and serves to prevent the flattening or distortion of the tire. It is evident in this construction that the inverted arch is maintained at all times regardless of the direction of the pressure, and that consequently the practical advantages of the pneumatic tire are obtained without the liability of puncture. The greater the pressure transmitted the more the tendency to press the upper ends of the curved surfaces 9 together, thus eliminating the danger of splitting the tire under pressure.

I claim:

1. An automobile tire comprising an integral compression member provided with oppositely disposed vertical arches having substantially curved inner faces, and a tension member positioned between said arches thus providing channels on either side of said tension member having substantially triangular cross-sections.

2. An automobile tire comprising an integral compression member provided with oppositely disposed vertical arches having substantially curved inner faces, and a tension member having enlarged ends positioned between said arches thus providing channels on either side of said tension member having substantially triangular cross-sections.

3. An automobile tire comprising an integral compression member having an interior channel, said channel having enlarged portions extending longitudinally on either side thereof, a tension member extending horizontally across said channel and fitting within said enlarged portions, the walls of said channel forming vertical arches above and below said tension member.

4. An automobile tire formed from an integral compression member slit longitudinally, said slit communicating with an interior channel, a tension member fitting within said channel, and means for locking said tension member in place, the walls of said channel forming vertical arches above and below said tension member.

5. An automobile tire formed from an integral compression member slit longitudinally, said slit communicating with an interior channel, a tension member fitting within said channel, and means integral with said compression member for locking said tension member in place, the walls of said channel forming vertical arches above and below said tension member.

Signed by me at Chicago, Illinois, this 20th day of March 1909.

WILLIAM B. CONNELL.

Witnesses:
CLARENCE E. TAYLOR,
J. NORBY.